US008549420B1

United States Patent
Tibbett (10) Patent No.: US 8,549,420 B1
(45) Date of Patent: Oct. 1, 2013

(54) METHOD AND APPARATUS FOR DISPLAYING A GRAPHICAL OBJECT WITHIN A GRID OF A GRAPHICAL USER INTERFACE

(75) Inventor: Steve Tibbett, Brantford (CA)

(73) Assignee: Adobe Systems Incorporated, San Jose, CA (US)

( * ) Notice: Subject to any disclaimer, the term of this patent is extended or adjusted under 35 U.S.C. 154(b) by 225 days.

(21) Appl. No.: 12/803,383

(22) Filed: Jun. 25, 2010

(51) Int. Cl.
*G06F 3/048* (2013.01)

(52) U.S. Cl.
USPC .............................. 715/765; 715/767; 715/784

(58) Field of Classification Search
USPC .................. 715/765, 767, 764, 784
See application file for complete search history.

(56) References Cited

U.S. PATENT DOCUMENTS

| | | | |
|---|---|---|---|
| 6,271,824 B1 | 8/2001 | Chang | |
| 6,690,387 B2 * | 2/2004 | Zimmerman et al. | 345/684 |
| 6,803,931 B1 * | 10/2004 | Roman et al. | 715/800 |
| 7,405,739 B2 * | 7/2008 | Gannon | 345/660 |
| 2006/0265643 A1 * | 11/2006 | Saft et al. | 715/517 |
| 2006/0277488 A1 * | 12/2006 | Cok et al. | 715/784 |
| 2009/0282352 A1 * | 11/2009 | Solanki et al. | 715/765 |
| 2011/0197156 A1 * | 8/2011 | Strait et al. | 715/771 |

OTHER PUBLICATIONS

Hao Liu, et al., "Automatic Browsing of Large Pictures on Mobile Devices", Proceedings of the Eleventh ACM International Conference on Multimedia, Nov. 2-8, 2003, pp. 148-155, Berkeley, California.

Xin Fan, et al., "Visual Attention Based Image Browsing on Mobile Devices", Proceedings of the 2003 International Conference on Multimedia and Expo, 2003, pp. 53-56.

Satoshi Asami et al., "GridPix-Presenting Large Image Files Over the Internet", Technical Report No. UCB/CSD-00/1099, May 2000, pp. 1-10, Computer Science Division (EECS), University of California, Berkeley, California.

* cited by examiner

*Primary Examiner* — Doug Hutton, Jr.
*Assistant Examiner* — Li Sun
(74) *Attorney, Agent, or Firm* — Moser Taboada (57) ABSTRACT

A method and apparatus for displaying a graphical object in a grid located within in a graphical user interface (GUI) environment is disclosed. In one embodiment, the method for displaying a graphical object in a grid located in a GUI environment comprises positioning the graphical object in a cell of the grid, where a dimension of the graphical object is larger than a corresponding dimension of the cell, and repositioning the graphical object depending upon a position of a pointer of the GUI environment within the cell along the corresponding dimension.

18 Claims, 7 Drawing Sheets

FIG. 6

METHOD AND APPARATUS FOR DISPLAYING A GRAPHICAL OBJECT WITHIN A GRID OF A GRAPHICAL USER INTERFACE

BACKGROUND

1. Field

Embodiments generally relate to a method and apparatus for displaying graphical objects, and more specifically, to method and apparatus for displaying graphical objects in a grid within a graphical user interface.

2. Description of the Related Art

Graphical objects, such as webpage banners, images and the like, are often displayed as a collection of thumbnail previews in a grid within a graphical user interface (GUI), such as an Internet browser. Such a grid comprises multiple rectangular cells arranged in an array. The purpose of providing the thumbnail preview is to allow quick and easy visualization of multiple graphical objects in a single view within the GUI. Such a presentation may be used during web page design to enable convenient identification and selection of objects for use in the page, or merely for storing objects for convenient review.

However, a thumbnail preview of graphical object(s) that have an extended aspect ratio presents various problems. For example, graphical objects with an extended aspect ratios such as graphical objects having a width that is much larger than the height, and/or graphical objects with a height much larger than the width are difficult to display as thumbnails. Generally, resizing (such as shrinking) such graphical objects results in a thumbnail preview occupying the grid only partially and a major portion of the cell being occupied with blank or white space. For example, a thumbnail preview of graphical object with a height much larger than width, leaves a major part along the width of a cell of the grid to be occupied with blank or white space. At the same time, the size of the graphical object may be reduced to a high degree, which may cause difficulty in viewing the graphical object within the thumbnail cell. Therefore, such conventional thumbnail previews do not provide an effective visualization of graphical objects in the grid.

Accordingly, there exists a need for an improved method and apparatus for displaying graphical objects in a grid within a graphical user interface.

SUMMARY

Embodiments generally include a method and apparatus for displaying a graphical object in a grid located in a GUI environment are disclosed. In one embodiment, the method for displaying a graphical object in a grid located within a GUI environment comprises positioning the graphical object in a cell of the grid, where a dimension of the graphical object is larger than a corresponding dimension of the cell, and repositioning the graphical object depending upon a position of a pointer of the GUI environment within the cell along the corresponding dimension.

While the method and apparatus for displaying a graphical object in a grid located within a GUI environment are described herein by way of example for several embodiments and illustrative drawings, those skilled in the art will recognize that the method and apparatus for displaying a graphical object in a grid located within a GUI environment are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for displaying graphical objects as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for displaying a graphical object in a grid located within a GUI environment are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
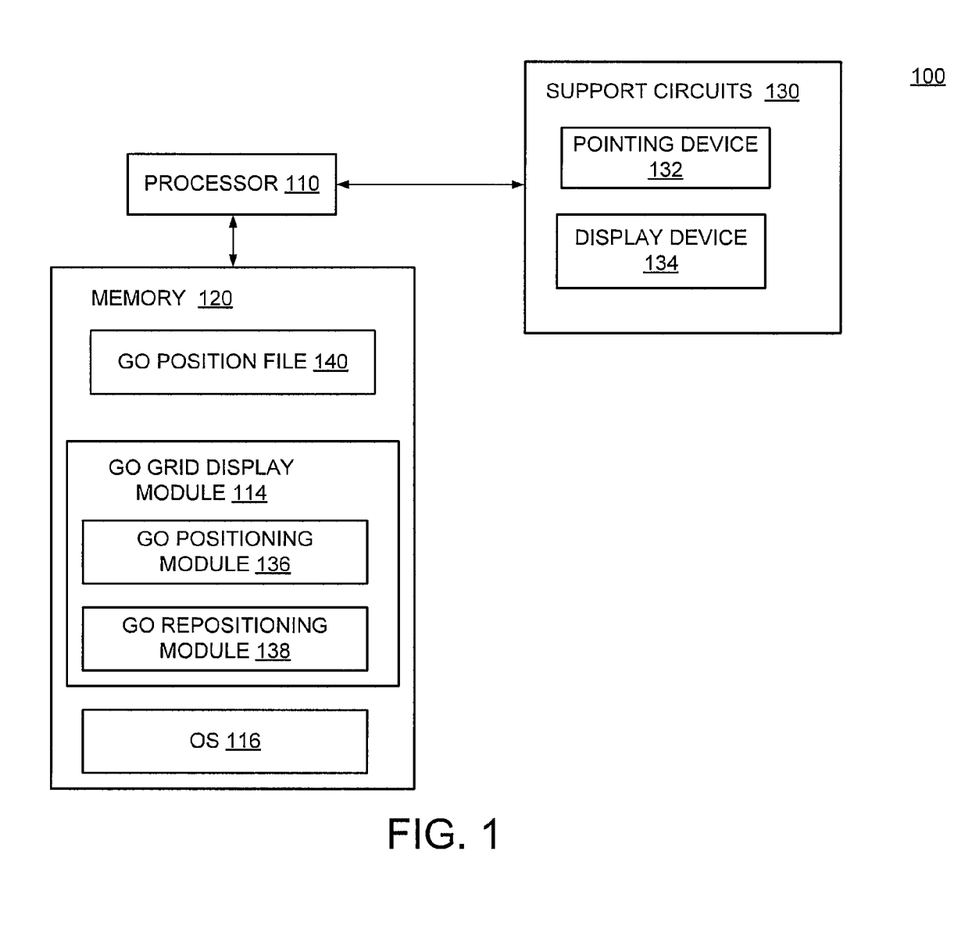
FIG. 1 is a block diagram of a computer system for providing graphical objects in a grid within a graphical user interface on a display device according to one or more embodiments.

FIG. 1 is a block diagram of a computer 100 for displaying one or more graphical objects (GO) in a grid within a graphical user interface (GUI), for example, on a display device (e.g., display device 134), according to at least one embodiment. The computer 100 includes a processor 110, a memory 120, and support circuits 130. The support circuits 130 include a pointing device 132 and a display device 134. The pointing device 132 provides a pointer in the GUI environment displayed in the display device 134. The memory 110 includes an Operating System (OS) 116, a GO grid display module 114 and a GO position file. The GO grid display module 114 displays a graphical object in a grid (an array of geometric-shaped cells, for example, rectangular-shaped cells). The GO grid display module 114 generally comprises two functional modules—a GO positioning module 136 and a GO repositioning module 138. These two modules could be combined into a single module; however, for ease of explanation, the modules are described separately below with respect to FIGS. 4 and 5 respectively. The grid is located in a GUI environment, for example, on the display device 134. The GO is positioned in the grid through execution of the GO positioning module 136. The GO positioning file creates and stores the GO position file containing information defining to position of the GO. Based on inputs from the pointing device 132, and the content of the GO position file, the GO is repositioned within the grid through execution of the GO repositioning module 138. According to various embodiments, the computer 100 is, for example, a computer system 600 illustrated and described in detail with respect to FIG. 6.

Figure 2:
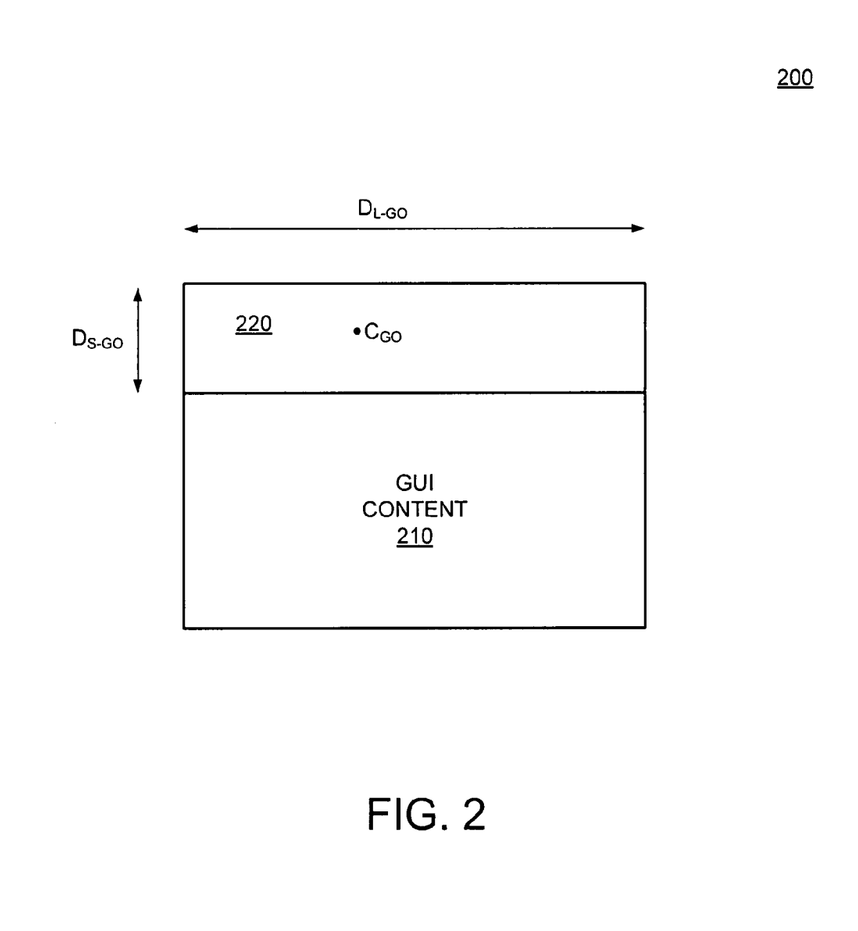
FIG. 2 is a graphical user interface displaying a graphical object according to one or more embodiments.

FIG. 2 is a schematic representation of a graphical user interface (GUI) 200 according to at least one embodiment. In the illustrated embodiment, the GUI 200 includes GUI content 210 and a graphical object 220. The GUI 200 may be used to display, for example, a web page. The graphical object 220 includes, for example, a banner for the web page, or other images or display objects. Typically, a banner of a web page has a width much larger than height. For example, a typical horizontal banner of a web page has a width of 368 pixels and a height of 60 pixels. The GUI content 210 may, for example, be text or other components of a web page.

In the illustrated embodiment, the graphical object (GO) 220 has a rectangular shape with a longer dimension represented by $D_{L-GO}$ and a shorter dimension represented by $D_{S-GO}$. The center of the graphical object 220 is denoted by $C_{GO}$. Typically, a banner of a web page has a width that is much larger than height. For example, many web pages have a common banner size of a width of 368 pixels and a height of 60 pixels. Those skilled in the art will appreciate that though a rectangular shape of the graphical object 220 is illustrated for ease of description, the shape of graphical objects is not restricted to be a rectangle, according to various embodiments, and may include other shapes such as a circle, square, triangle, or any other irregular shape. In such cases, the longer and shorter dimensions are measured along the smallest rectangle that can enclose the graphical object when the graphical object is displayed in the intended orientation. For example, in case of the graphical object shaped as an ellipse intended to be displayed such that the major axis is vertical, and the minor axis is horizontal, the larger dimension is the height of the ellipse along the major axis, while the smaller dimension is the width of the ellipse along the minor axis.

Figure 3A:
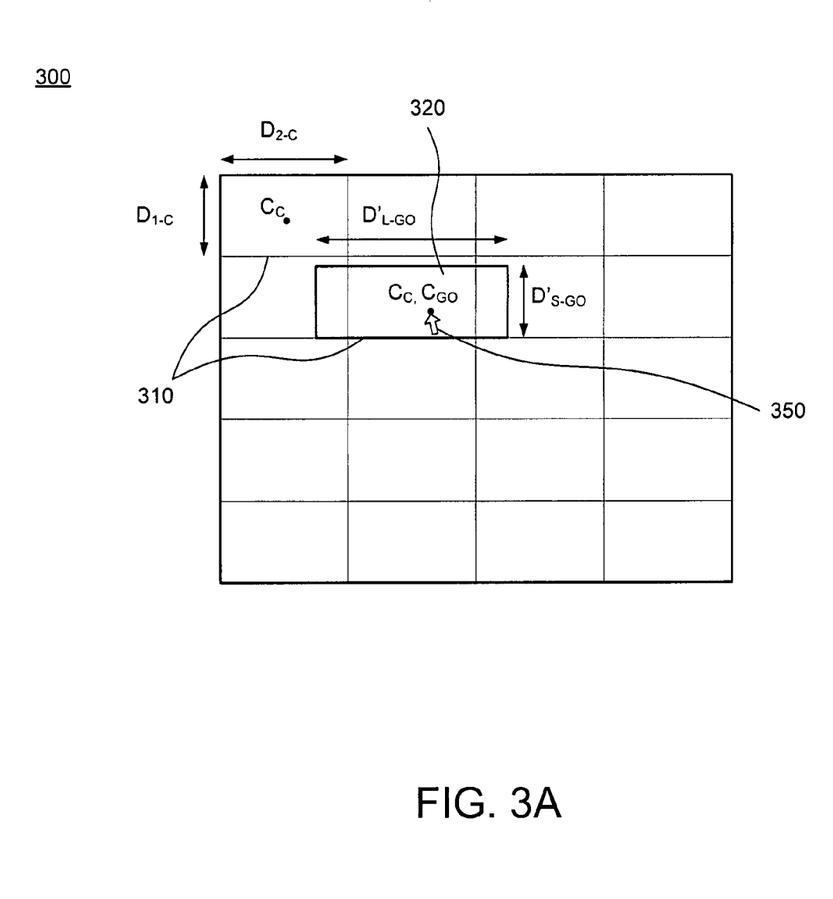
FIG. 3A is a schematic representation of a grid displaying a graphical object positioned within a cell, according to one or more embodiments.

FIG. 3A is a schematic representation of a grid 300 according to an embodiment of the present invention. The grid 300 comprises multiple cells (each denoted by the numeral 310) arranged in an M×N array, where M and N are integers greater than zero. Each cell is capable of displaying at least a portion of a graphical object 320. Each cell has a geometric shape, for example, rectangular. However other cell shapes are contemplated including, but not limited to square, circle, oval, triangle and the like. In the illustrated embodiment using a rectangular cell, one dimension of the cell 310 along a vertical axis is represented by $D_{1-C}$ and the other dimension along a horizontal axis is represented by $D_{2-C}$. The centre of the cell 310 is denoted by $C_C$. The graphical object 320 is initially positioned in the cell 310 such that a center of the graphical object 320 (represented by $C_{GO}$) and the centre of the cell 310, $C_C$ are coincident. A pointer 350 is further positioned to coincide with the centre of the cell $C_C$.

Further, in the illustrated embodiment, the graphical object 320 is resized such that, on resizing, the shorter dimension of the graphical object 320 equals the corresponding dimension $D_{1-C}$ of the cell 310, in the present illustration. Accordingly, a resized shorter dimension $D'_{S-GO}$ and a resized longer dimension $D'_{L-GO}$ are obtained, such that the resized shorter dimension, $D'_{S-GO}$ is equal to the corresponding cell dimension, $D_{1-C}$. The longer dimension $D_{L-GO}$ is resized to preserve the aspect ratio of the graphical object 320. Accordingly, the resized longer dimension $D'_{L-GO}$ is given by $D'_{L-GO}=D_{L-GO}*(D_{1-C}/D_{S-GO})$. Resizing the graphical object 320 in the manner illustrated above allows for an efficient utilization of the space within the cell 310 for viewing the graphical object 320. In certain cases, for example as illustrated by FIGS. 3A and 3B, the resized longer dimension $D'_{L-GO}$ is larger than the corresponding cell dimension $D_{2-C}$, and in such cases, according to various embodiments, the resized graphical object 320 is displayed in the cell 310 based on the movement of the pointer 350 within the cell 310, as illustrated below.

Figure 3B:
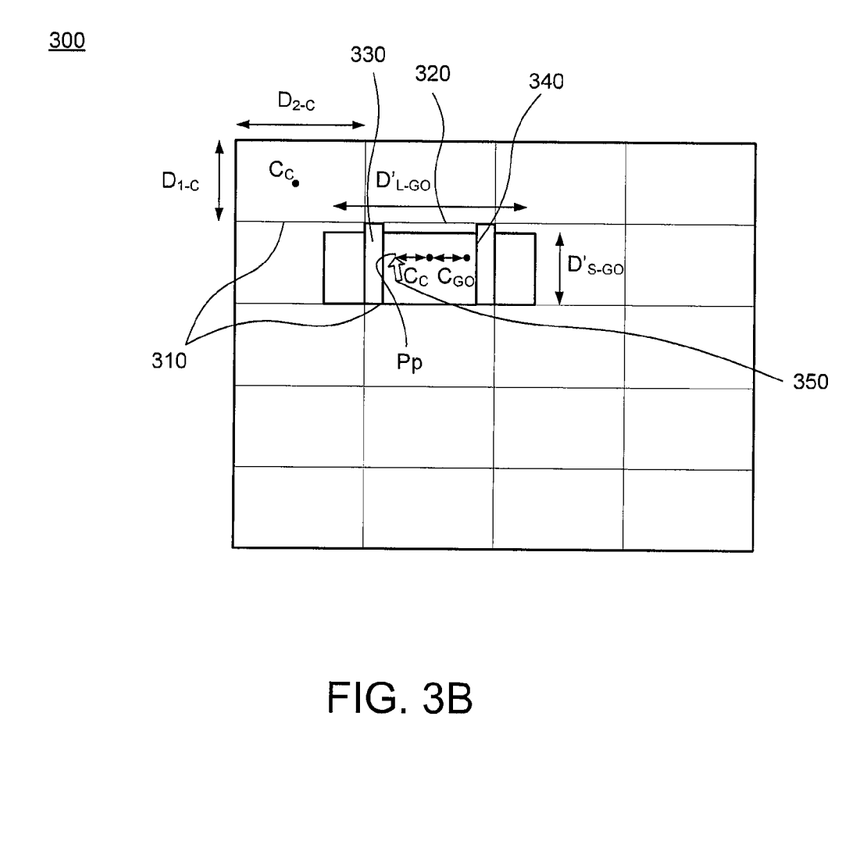
FIG. 3B is a schematic representation of the grid displaying the graphical object repositioned within the cell, according to one or more embodiments.

FIG. 3B is a schematic representation of the grid 300 displaying the graphical object 320 repositioned based on the position of the pointer 350, according to an embodiment of the present invention. In the illustrated embodiment, the pointer 350 is positioned away from the centre of the cell $C_C$ towards the left edge of the cell 310. As illustrated, the pointer 350 moves to a position represented by Pp. According to an embodiment of the invention, the graphical object 320 is repositioned and displayed within the cell 310 according to the position of the pointer 350 within the cell 310. In the illustration of FIG. 3B, the graphical object 320 is repositioned such that the center of the graphical object, $C_{GO}$ is moved in a direction opposite to the direction of movement of the pointer 350, for example, towards the right edge of the cell 310. The movement of the pointer 350 towards left allows visualization of part of the graphical object 320 that extends beyond the left edge of the cell 310. Similarly, the pointer 350 may be moved towards the right to the center of the cell 310, $C_C$ to view part of the graphical object 320 that extends beyond the right edge of the cell 310. In this manner, the graphical object 320 is completely viewable within the cell 310 by positioning the pointer 350 appropriately. Those skilled in the art will appreciate that the movement of the pointer 350, and the corresponding movement of the graphical object 320 is not restricted to 'left', or 'right', but according to various embodiments may include 'up' and 'down', and a combinations thereof. While in the illustration of FIGS. 3A and 3B, the center of the graphical object moves in a direction opposite to that of the movement of the pointer, in other embodiments, the center of the graphical object moves in the same direction as the movement of the pointer.

According to an embodiment, the cell 310 comprises one or more margins, for example, a margin 330 along an edge of the cell 310, and a margin 340 along another edge of the cell, as shown in FIG. 3B. The margins 330, 340 are configured such that a change in the position of the pointer within the margin does not result in the repositioning of the graphical object. However, when the pointer is positioned within the margin, the corresponding edge of the graphical object 320 is displayed in the cell 310 (i.e., when the pointer is in the left or right cell margin, the graphical object repositions as far, respectively, to the left or right as possible). An exemplary margin size is 10 pixels. However, other margin sizes may be utilized.

Figure 4:
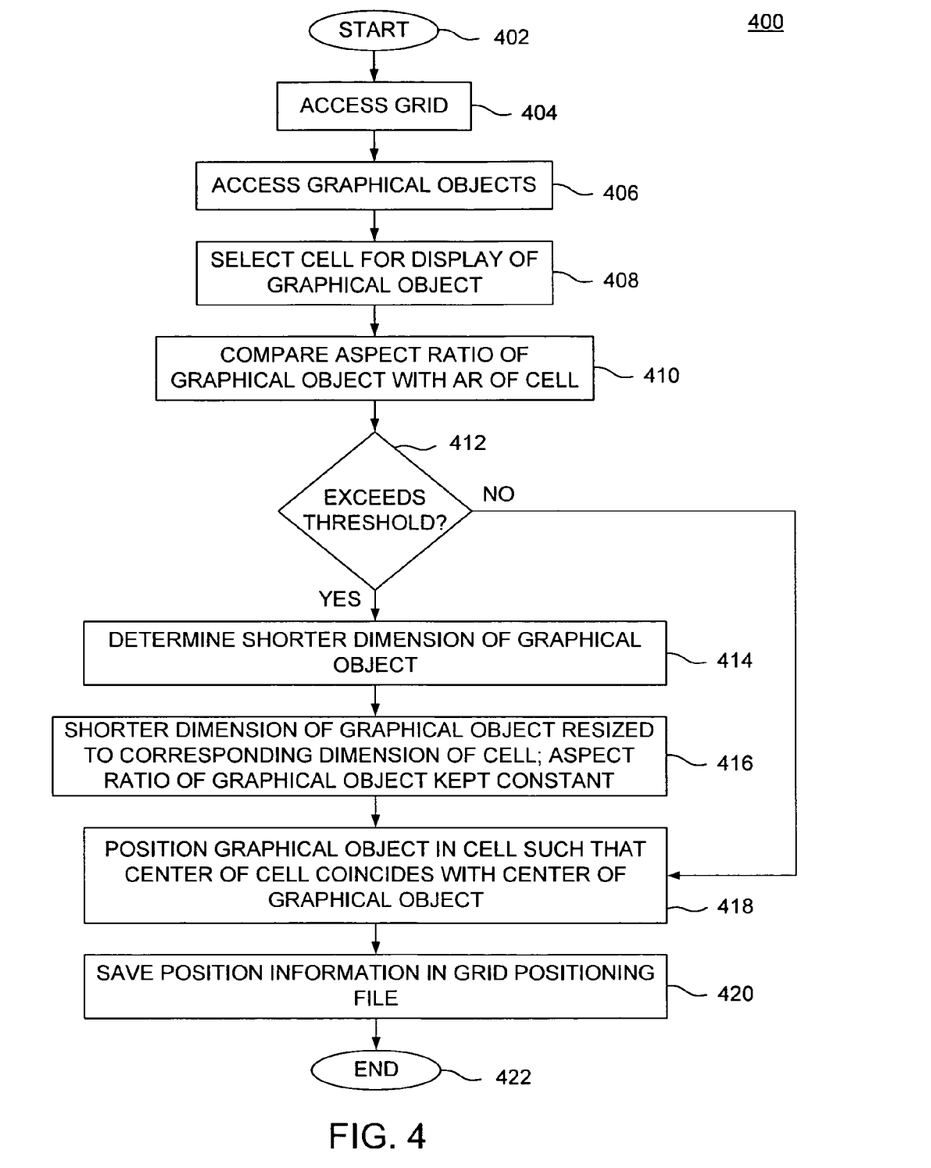
FIG. 4 is a flow diagram illustrating a method for positioning a graphical object in a cell of a grid according to one or more embodiments.

FIG. 4 is a flow diagram illustrating a method 400 for positioning a graphical object in a cell of a grid according to one or more embodiments, e.g., through execution of GO positioning module 136. The method 400 starts at step 402, and proceeds to step 404 at which the grid is accessed. At step 406, the graphical object to be displayed in the grid is accessed. At step 408, a cell in the grid is selected for displaying the graphical object. The cell is selected according to a predefined algorithm that for example, checks for the availability of the cell for display or obtains user preference or uses a combination of both availability and user preference among others. The graphical object is, for example, the graphical object 220 of FIG. 2. The grid is similar to, for example, the grid 300 and the cell selected for display of graphical object is similar to the cell 310 of FIGS. 3A and 3B.

At step 410, an aspect ratio of the graphical object to be displayed in the grid is compared to the aspect ratio (AR) of the selected cell. At step 412, a determination is made as to whether the difference between the AR of the graphical object and the AR of the cell exceeds a predetermined threshold. If the difference between the AR of the graphical object and the AR of the cell exceeds a predetermined threshold (option "YES"), the method proceeds to step 414. If the difference between the AR of the graphical object and the AR of the cell does not exceed a predetermined threshold (option "NO"), the method proceeds to step 418. The predetermined threshold, according to an example is 2. Those skilled in the art will appreciate that the predetermined threshold can be configured according to the typical aspect ratios of graphical objects to be displayed, and the aspect ratio of the cells of the grid.

At the step 414, a shorter dimension of the graphical object is determined. At step 416, the graphical object is resized such that the shorter dimension of the resized graphical object is equal to a corresponding dimension of the cell, while keeping the aspect ratio of the graphical object constant. For example, if the graphical object 220 of FIG. 2 is resized to be positioned into the cell 310 of FIG. 3A, the graphical object 220 is resized by a ratio of $D_{1-C}/D_{S-GO}$ since the shorter dimension of the graphical object 220 ($D_{S-GO}$) corresponds to $D_{1-C}$. Further, $D'_{L-GO}$ represents the longer dimension that the graphical object is resized to, at the step 416. If at the step 412, the threshold is not exceeded, the graphical object is not resized and in such cases, $D'_{L-GO}=D_{L-GO}$.

At the step 418, the graphical object is positioned in the cell of the grid such that the centre of the graphical object, $C_{GO}$ coincides with the centre of the cell, $C_C$. Subsequently, at step 420, position information is saved in a GO position file (140 of FIG. 1). The position information includes information about the position of the graphical object with respect to the selected cell. The position information may for example, be in the form of X and Y coordinates of the centre of the graphical object with respect to the centre of the selected cell among others. The GO position file stores the position information of the graphical object and such position information is accessible to a software program for display of the graphical object in the grid similar to for example, GO grid display module 114 of FIG. 1.

Figure 5:
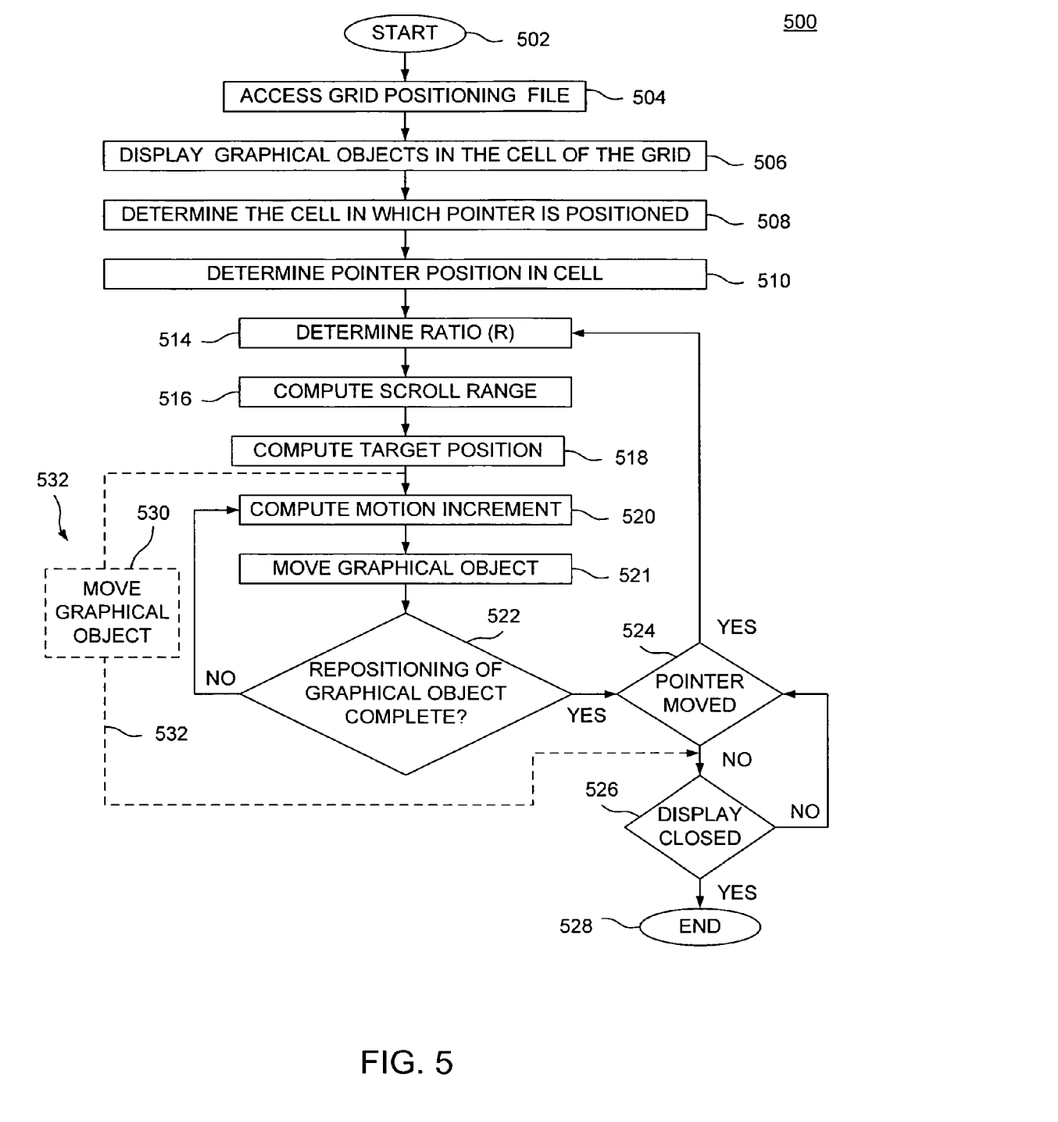
FIG. 5 is a flow diagram illustrating a method for repositioning the graphical object depending upon a position of the pointer according to one or more embodiments.

FIG. 5 is a flow diagram illustrating a method 500 for repositioning the graphical object depending upon a position of the pointer according to one or more embodiments, e.g., through execution of GO repositioning module 138. The method 500 starts at step 502 and proceeds to step 504 at which the GO position file is accessed. At step 506, graphical object is displayed in the selected cell of the grid. At step 508, the cell in which the pointer is positioned is determined. At step 510, the method 500 determines the position of the pointer within the cell (mousePos) with respect to the length of the long dimension cell ($D_{2-C}$). At step 514, the method 500 determines a ratio (R) of the pointer position relative to either edge with respect to the length of the cell, $D_{2-c}$ as:

$$R=\text{mousePos}/D_{2-C} \quad (1)$$

At step 516, the method 500 computes the total scroll range for the GO as:

$$\text{scrollRange}=D'_{L-GO}-D_{2-C} \quad (2)$$

where, as indicated in FIG. 3A, $D'_{L-GO}$ is the scaled width of the GO and the $D_{2-C}$ is the width of the cell in which the GO is being previewed.

At step 518, the method computes the target position of the GO within the cell as:

$$\text{scrollTarget}=-(R*\text{scrollRange}) \quad (3)$$

According to various embodiments using Equations 1-3, if the pointer moves to a position that is 20% of the length of the cell measured from the left edge of the cell, the GO is repositioned to 20% of the distance along the length of the GO measured from the left edge of the GO along the longer dimension of the GO. The portion of the GO originally extended beyond the cell, and therefore not visible, is now visible in the cell due to repositioning. In the process, a portion of the GO earlier visible in the cell, now extends out of the cell, and is no longer visible after the repositioning.

For example, if the GO has a length of 500 pixels and cell has a width of 100 pixels, when centered; pixels 200 to 299 are visible within the cell. If the pointer is positioned at pixel 20 along the width of the cell, R is 20%. Using Equations 1-3, the GO is repositioned such that target position is 100; thus pixels 100 to 199 of the GO now are visible in the cell.

The transition to the new position may be immediate, i.e., position the pointer, compute the target position and move the GO in a single step to the target position. This option is represented by dashed path 532, where, at step 530, the method 500 moves the GO to the target position immediately after computing the target position in step 518.

According to various other embodiments, the transition from a first position of the GO displayed within the cell to a desired or target position is performed in a stepwise manner to simulate acceleration and/or deceleration of the GO with respect to the cell. According to certain embodiments, the transition is made in gradual steps, for example, at predetermined periodic intervals. For example, at step 520, with each clock increment (e.g., a clock event), the method computes a motion increment (image.x) for the GO and, at step 521, moves the GO the computed motion increment to reposition the GO to an interim position. The repositioning is controlled as:

$$image.x = image.x + ((scrollTarget - image.x)/4) \quad (4)$$

Using Equation 4 at each clock event causes the GO to move with decelerating motion, e.g., a large initial step followed by decreasingly smaller steps until the target position is reached. The size of the increment is controlled by the divisor, e.g., 4. This number may be chosen to alter the speed at which the deceleration occurs.

According to an example, $D_{2-C}$ is 100 pixels, $D'_{L-GO}$ is 500 pixels, and R is 20%. At the step 520, the graphical object is repositioned by 20 pixels to the left, i.e., image.x=(−80−0)/4. Thus, pixels 20 through 219 of the GO appear in the cell. If the GO movement is not complete, at step 522, the query is negatively answered and the method repeats steps 520 and 521 to calculate another increment. Upon the next clock event, the method 200 moves the GO by the new increment. Continuing with the forgoing example, the next increment is 15 pixels to the left, i.e., (−80−(−20))/4. At the next clock increment, the move is 11.25 pixels and so on. The decreasing size of the increments creates a decelerating appearance to the motion.

In the foregoing embodiment, the clock increments were fixed and the movement increments were variable; however, in other embodiments, the movement increments may be fixed and the clock increments (clock period) variable to provide the same decelerating motion effect. Using a graduated repositioning period, e.g., a faster rate when beginning movement and slower when reaching the target position, or vice versa, an acceleration and/or deceleration effect can be achieved.

At step 522, the method 500 determines if the GO has been repositioned according to the calculated position (scrollTarget). If the repositioning of the GO is not complete (option "NO"), the method 500 returns to step 520 and repositions the GO by another increment (image.x) at the desired periodic frequency. If the repositioning of the GOO is complete (option "YES"), the method 500 proceeds to step 524. At step 524, a determination is made if the pointer has moved. If the pointer has moved (option "YES"), the method 500 returns to step 516. If the pointer has not moved (option "NO"), the method 500 proceeds to step 526. At step 526, a determination is made if the display is closed. If the display is not closed (option "NO"), the method 500 returns to step 524 to check if the pointer has moved. If the display is closed (option "YES"), the method 500 proceeds to end at step 528. A software program, such as, for example, the GO grid display module 114 of FIG. 1 shuts down the display of graphical objects in a grid within the GUI.

It is noted here that the centre aligned positioning of the graphical object with $C_C$ and $C_{GO}$ coinciding as described in FIGS. 3A, 3B, 4 and 5 is only illustrative in nature and not meant to restrict the various illustrated embodiments. In other embodiments, for example, the graphical object is positioned originally with alternate alignments. For example, the graphical object is positioned such that a top left corner of the graphical object is aligned with a top left corner of the cell. In this embodiment, calculations governing the desired movement (that is, new position) of the graphical object within the cell based on the movement of the pointer are accordingly derived, in a manner similar to that described above. Many more such alignment possibilities for positioning a graphical object in a cell based on the position of a pointer will readily occur to one skilled in the art, and all such variations are included within the scope and spirit of the present invention. The ratio R of the pointer movement is calculated such that the graphical object moves a percentage amount equal to a percentage amount of the movement of the pointer within the cell.

The various embodiments described herein provide several advantages. For example, resizing the graphical objects such that the shorter dimension of the graphical object equals the corresponding dimension of the cell prevents the large blank/unutilized space within the cell, as compared to resizing of the graphical object such that the complete graphical object is displayed within the cell. Further, movement of the pointer within the cell allows for comparative ease of display and viewing of the graphical object within the cell.

Example Computer System

Various embodiments of a system and method for displaying a graphical object in a grid located in a GUI environment, as described herein, may be executed on one or more computer systems, which may interact with various other devices. One such computer system is a computer system 600 illustrated by FIG. 6, which may in various embodiments implement any of the elements or functionality illustrated in FIGS. 1-5. In various embodiments, computer system 600 may be configured to implement displaying a graphical object in a grid located in a GUI environment, described above. While the illustrated system demonstrates the computer system 600 implementing displaying a graphical object in a grid located in a GUI environment, the computer system 600 may be used to implement any other system, device, element, functionality or method of the above-described embodiments. In the illustrated embodiments, the computer system 600 may be configured to implement displaying a graphical object in a grid located in a GUI environment, as processor-executable executable program instructions 622 (e.g., program instructions executable by processor(s) 610a-610n) in various embodiments.

Figure 6:
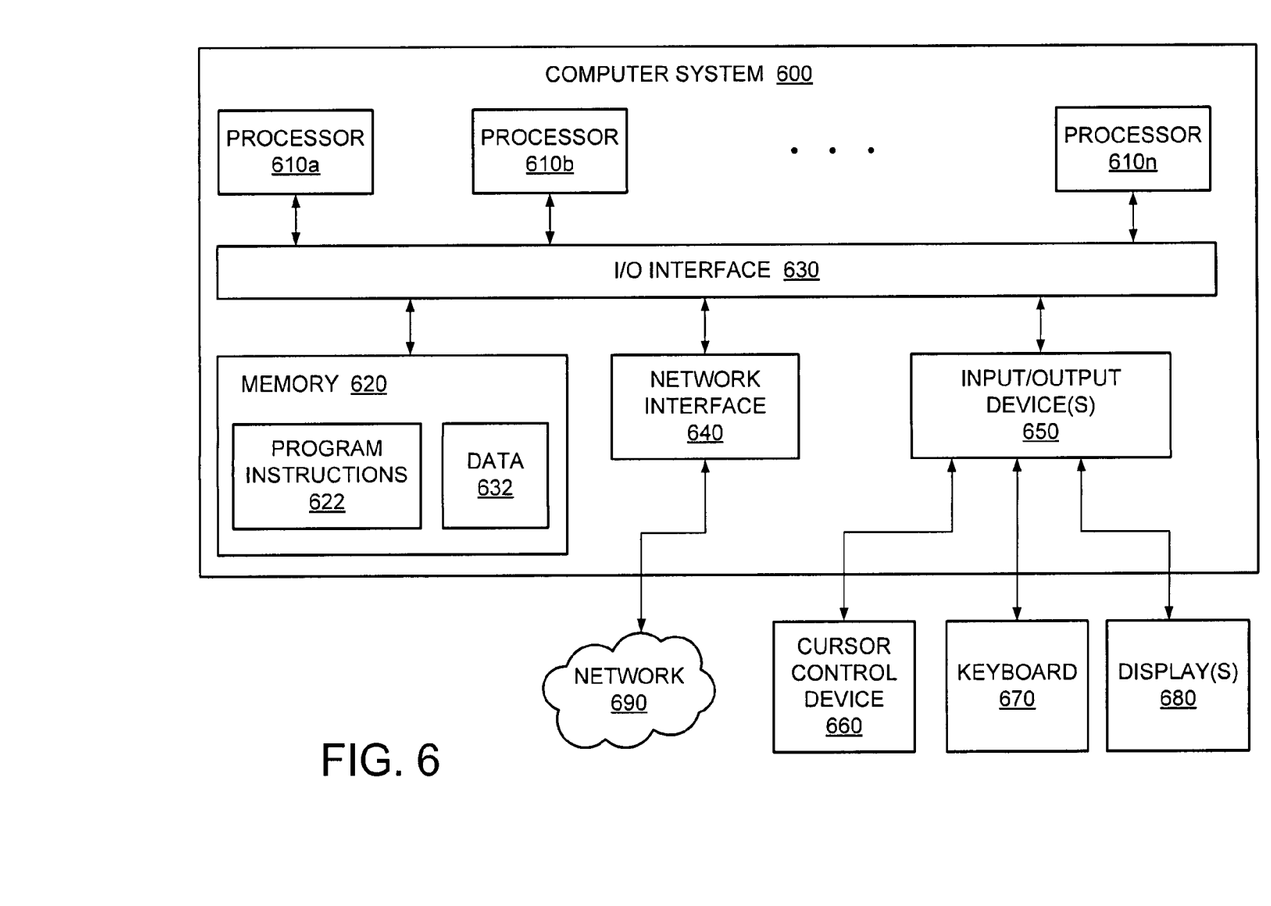
FIG. 6 is a block diagram of a computer system, according to one or more embodiments.

In the illustrated embodiment, the computer system 600 includes one or more processors 610a-610n coupled to a system memory 620 via an input/output (I/O) interface 630. The computer system 600 further includes a network interface 640 coupled to I/O interface 630, and one or more input/output devices 650, such as cursor control device 660, keyboard 670, and display(s) 680. In various embodiments, any of the components 660-680 may be utilized by application software such as for example, the GO grid display module 114 of FIG. 1, to receive user input. In various embodiments, a user interface may be generated and displayed on the display 680. In some cases, it is contemplated that embodiments may be implemented using a single instance of the computer system 600, while in other embodiments multiple such systems, or multiple nodes making up the computer system 600, may be configured to host different portions or instances of various embodiments. For example, in one embodiment some elements may be implemented via one or more nodes of the computer system 600 that are distinct from those nodes implementing other elements. In another example, multiple nodes may implement the computer system 600 in a distributed manner.

In different embodiments, the computer system 600 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computer system 600 may be a uniprocessor system including one processor 610a, or a multiprocessor system including several processors 610a-610n (e.g., two, four, eight, or another suitable number). The processors 610a-610n may be any suitable processor capable of executing instructions. For example, in various embodiments the processors 610a-610n may be general-purpose or embedded processors implementing any of a variety of instruction set architectures (ISAs), such as the x96, POWERPC®, SPARC®, or MIPS® ISAs, or any other suitable ISA. In multiprocessor systems, each of the processors 610a-610n may commonly, but not necessarily, implement the same ISA.

System memory 620 may be configured to store program instructions 622 and/or data 632 accessible by the processors 610a-610n. In various embodiments, the system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within the system memory 620. In other embodiments, program instructions and/or data may be received, sent or stored upon different types of computer-accessible media or on similar media separate from the system memory 620 or the computer system 600.

In one embodiment, the I/O interface 630 may be configured to coordinate I/O traffic between the processors 610a-610n, system memory 620, and any peripheral devices in the device, including the network interface 640 or other peripheral interfaces, such as the input/output devices 650, In some embodiments, the I/O interface 630 may perform any necessary protocol, timing or other data transformations to convert data signals from one components (e.g., system memory 620) into a format suitable for use by another component (e.g., processors 610a-610n). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of the I/O interface 630 may be split into two or more separate components, such as a north bridge and a south bridge, for example. Also, in some embodiments some or all of the functionality of the I/O interface 630, such as an interface to the system memory 620, may be incorporated directly into the processors 610a-610n.

The network interface 640 may be configured to allow data to be exchanged between the computer system 600 and other devices attached to a network (e.g., network 690), such as one or more external systems or between nodes of the computer system 600. In various embodiments, the network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The Input/output devices 650 may, in some embodiments, include one or more display terminals, keyboards, keypads, touchpads, scanning devices, voice or optical recognition devices, or any other devices suitable for entering or accessing data by one or more computer systems. Multiple input/output devices may be present in the computer system 600 or may be distributed on various nodes of the computer system 600. In some embodiments, similar input/output devices may be separate from the computer system 600 and may interact with one or more nodes of the computer system 600 through a wired or wireless connection, such as over the network interface 640.

In some embodiments, the illustrated computer system may implement any of the methods described above, such as the methods illustrated by the flowchart of FIGS. 4 and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for displaying a graphical object in a grid comprising a plurality of cells located in a GUI environment, the method comprising:
   positioning the graphical object in a cell of the plurality of cells of the grid, where an axial dimension of the graphical object is larger than a corresponding axial dimension of the cell, wherein a portion of the graphical object is hidden outside the cell;
   determining a position of a cursor within the cell;
   determining a percentage representing a distance along the corresponding axial dimension from the determined cursor position to an edge of the cell; and
   repositioning the graphical object along the corresponding axial dimension depending upon the cursor position within the cell, wherein the repositioning displays the previously hidden portion of the graphical object according to the determined percentage, and wherein the repositioning is performed while displaying the entire grid.

2. The method of claim 1, wherein the positioning of the graphical object further comprises resizing, if the difference between an aspect ratio of the graphical object and an aspect ratio of the cell exceeds a predetermined threshold value.

3. The method of claim 2, wherein the resizing further comprises resizing the graphical object wherein, a shorter dimension of the graphical object is reduced to a corresponding dimension of the cell while keeping the aspect ratio of the graphical object constant.

4. The method of claim 3, wherein the shorter dimension of the graphical object is at least one of a vertical dimension of the graphical object or a horizontal dimension of the graphical object.

5. The method of claim 1, wherein the graphical object is initially positioned in the cell wherein, a center of the corresponding dimension of the graphical object coincides with a center of the corresponding dimension of the cell.

6. The method of claim 1, wherein the graphical object is initially positioned in the cell wherein, a top left edge of the graphical object coincides with a top left edge of the cell.

7. The method of claim 1, wherein repositioning the graphical object further comprises:
   incrementally positioning the graphical object until the graphical object is displayed at a target position.

8. The method of claim 7 further comprising defining the increments or an update rate used in association with each increment on a graduated scale to create at least one of an acceleration or deceleration effect.

9. The method of claim 1, wherein the graphical object is repositioned to position an edge of the graphical object coinciding with a corresponding edge of the cell while the pointer is positioned in a margin of the cell, the margin being along the corresponding edge of the cell.

10. An apparatus for displaying a graphical object in a grid comprising a plurality of cells located in a graphical user interface (GUI) environment, the apparatus comprising:
    a display device for displaying the graphical object positioned in a cell of the plurality of cells of the grid in the GUI environment, where an axial dimension of the graphical object is larger than a corresponding axial dimension of the cell of the plurality of cells, wherein a portion of the graphical object is hidden outside the cell; and
    a graphical object grid display module for:
       determining a position of a cursor within the cell;
       determining a percentage representing a distance along the corresponding axial dimension from the determined cursor position to an edge of the cell; and
       repositioning the graphical object along the corresponding axial dimension depending upon the cursor position within the cell, wherein the repositioning displays the previously hidden portion of the graphical object according to the determined percentage, and wherein the repositioning is performed while displaying the entire grid.

11. The apparatus of claim 10, wherein the display device displays the graphical object after the graphical object is resized, where the graphical object is resized if the difference between an aspect ratio of the graphical object and an aspect ratio of the cell exceeds a predetermined threshold value.

12. The apparatus of claim 10, wherein the cell comprises a margin along at least an edge of the cell, and wherein an edge of the graphical object is positioned to coincide with a corresponding edge of the cell while the pointer is positioned in the margin along the corresponding edge of the cell.

13. A non-transitory computer readable medium for storing software that, when executed by a computing system, causes a computing system to perform a method for displaying a graphical object in a grid comprising a plurality of cells located in a GUI environment, the method comprising:
    positioning the graphical object in a cell of the plurality of cells of the grid, where an axial dimension of the graphical object is larger than a corresponding axial dimension of the cell, wherein a portion of the graphical object is hidden outside the cell;
    determining a position of a cursor within the cell;
    determining a percentage representing a distance along the corresponding axial dimension from the determined cursor position to an edge of the cell; and
    repositioning the graphical object along the corresponding axial dimension depending upon the cursor position within the cell, wherein the repositioning displays the previously hidden portion of the graphical object according to the determined percentage, and wherein the repositioning is performed while displaying the entire grid.

14. The non-transitory computer readable medium of claim 13, wherein the positioning of the graphical object further comprises resizing, if the difference between an aspect ratio of the graphical object and an aspect ratio of the cell exceeds a predetermined threshold value.

15. The non-transitory computer readable medium of claim 14, wherein the resizing further comprises resizing the graphical object wherein, a shorter dimension of the graphical object is reduced to a corresponding dimension of the cell while keeping the aspect ratio of the graphical object constant.

16. The non-transitory computer readable medium of claim 13, wherein the graphical object is initially positioned in the cell wherein, a center of the corresponding dimension of the graphical object coincides with a center of the corresponding dimension of the cell.

17. The non-transitory computer readable medium of claim 13, wherein the graphical object is initially positioned in the cell wherein, a top left edge of the graphical object coincides with a top left edge of the cell.

18. The non-transitory computer readable medium of claim 13, wherein repositioning the graphical object further comprises:
   incrementally positioning the graphical object until the graphical object is displayed at the target position.

* * * * *